United States Patent
Kameda

(10) Patent No.: US 9,855,801 B2
(45) Date of Patent: Jan. 2, 2018

(54) PNEUMATIC TIRE

(71) Applicant: The Yokohama Rubber Co., LTD., Minato-ku, Tokyo (JP)

(72) Inventor: Norifumi Kameda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 1029 days.

(21) Appl. No.: 13/675,565

(22) Filed: Nov. 13, 2012

(65) Prior Publication Data
US 2013/0118662 A1    May 16, 2013

(30) Foreign Application Priority Data
Nov. 14, 2011 (JP) .................. 2011-249122

(51) Int. Cl.
*B60C 11/12* (2006.01)
*B60C 11/03* (2006.01)

(52) U.S. Cl.
CPC ............. *B60C 11/12* (2013.01); *B60C 11/03* (2013.01); *B60C 11/0302* (2013.01); *B60C 11/0306* (2013.01); *B60C 11/0318* (2013.01); *B60C 11/1218* (2013.01); *B60C 2011/0334* (2013.01); *B60C 2011/1295* (2013.01)

(58) Field of Classification Search
CPC ............. B60C 11/0302; B60C 11/0306; B60C 11/1218; B60C 2011/1227; B60C 2011/0381; B60C 2011/0383
See application file for complete search history.

(56) References Cited

U.S. PATENT DOCUMENTS 4,566,514 A * 1/1986 Mauk ...................... B60C 11/12
                                                                    152/209.23
5,957,180 A * 9/1999 Kuramochi et al. ...... 152/209.21
(Continued)

FOREIGN PATENT DOCUMENTS

DE    102010060946    *   6/2012
EP          0541004    *   5/1993
(Continued)

OTHER PUBLICATIONS

English machine translation of JP2923795, dated Jul. 1999.*
(Continued)

*Primary Examiner* — Robert Dye
(74) *Attorney, Agent, or Firm* — Thorpe North & Western

(57) ABSTRACT

A pneumatic tire includes circumferential main grooves extending in a tire circumferential direction and land portions partitioned and formed by the circumferential main grooves. The land portion of a center region and the land portions of left and right shoulder regions each have a plurality of sipes. Not less than 90% of the sipes disposed in the center region are constituted by two-dimensional sipes and not less than 90% of the sipes disposed in the shoulder regions are constituted by three-dimensional sipes. The left and right shoulder land portions each have a plurality of lug grooves arranged in the tire circumferential direction. A pitch number N_ce of the lug grooves in the land portion of the center region and a pitch number N_sh of the lug grooves in the land portions and of the left and right shoulder regions have a relationship such that N_ce>N_sh.

22 Claims, 8 Drawing Sheets

(56) References Cited

U.S. PATENT DOCUMENTS

| | | | | |
|---|---|---|---|---|
| 6,003,575 A * | 12/1999 | Koyama | ................ | B60C 11/12 |
| | | | | 152/209.18 |
| D596,109 S * | 7/2009 | de Briey-Terlinden | ..... | D12/553 |
| 7,784,509 B2 * | 8/2010 | Tamura | ............... | B60C 11/0306 |
| | | | | 152/209.18 |
| 2002/0112800 A1 * | 8/2002 | Suzuki | .................... | B60C 11/11 |
| | | | | 152/209.3 |
| 2007/0199634 A1 * | 8/2007 | Sakamaki | ............... | B60C 11/11 |
| | | | | 152/209.23 |
| 2008/0156405 A1 | 7/2008 | Tanabe | | |
| 2012/0103493 A1 * | 5/2012 | Knispel | .............. | B60C 11/0302 |
| | | | | 152/209.25 |

FOREIGN PATENT DOCUMENTS

| | | | |
|---|---|---|---|
| JP | S61-039606 | | 3/1986 |
| JP | H02-011404 | | 1/1990 |
| JP | H07-132709 | | 5/1995 |
| JP | 08-156524 | * | 6/1996 |
| JP | 08-213623 | * | 8/1996 |
| JP | 09-226324 | * | 9/1997 |
| JP | 09-226326 | * | 9/1997 |
| JP | H09-263110 | | 10/1997 |
| JP | 2923795 | * | 7/1999 |
| JP | 2002-264611 | | 9/2002 |
| JP | 2003-146023 | * | 5/2003 |
| JP | 2003-211920 | | 7/2003 |
| JP | 2004-058755 | | 2/2004 |
| JP | 2007-083771 | * | 4/2007 |
| JP | 2009-012678 | | 1/2009 |
| JP | 2009-214775 | | 9/2009 |
| JP | 2010-006107 | | 1/2010 |
| JP | 2010-012879 | | 1/2010 |
| JP | 2010-254155 | * | 11/2010 |
| WO | WO 2006/022120 | | 3/2006 |

OTHER PUBLICATIONS

English machine translation of EP0541004, dated May 1993.*
English machine translation of JP2010-006107, dated Jan. 2010.*
English machine translation of JP09-226326, dated Sep. 1997.*
English machine translation of JP09-226324, dated Sep. 1997.*
English machine translation of JP2007-083771, dated Apr. 2007.*
English machine translation of JP2010-254155, dated Nov. 2010.*
English machine translation of JP08-156524, dated Jun. 1996.*
English machine translation of JP2003-146023, dated May 2003.*
English machine translation of JP08-216623, dated Aug. 1996.*

* cited by examiner

| | Conventional Example 1 | Conventional Example 2 | Comparative Example 1 | Comparative Example 2 | Comparative Example 3 | Working Example 1 |
|---|---|---|---|---|---|---|
| Tread pattern | FIG. 2 | FIG. 2 | FIG. 2 | FIG. 2 | FIG. 2 | FIG. 2 |
| Number of circumferential main grooves | 3 | 3 | 3 | 3 | 3 | 3 |
| Form of center land portion sipes | Two-dimensional | Two-dimensional | Two-dimensional | Two-dimensional | Three-dimensional | Two-dimensional |
| Form of shoulder land portion sipes | Two-dimensional | Two-dimensional | Three-dimensional | Three-dimensional | Two-dimensional | Three-dimensional |
| N_ce | 66 | 66 | 66 | 62 | 72 | 72 |
| N_sh | 66 | 66 | 66 | 72 | 62 | 62 |
| N_ce-N_sh | 0 | 0 | 0 | -10 | 10 | 10 |
| D_ce/D_sh | 1.0 | 1.0 | 1.0 | 1.0 | 1.0 | 1.5 |
| W_ce/TW | 0.60 | 0.60 | 0.60 | 0.60 | 0.60 | 0.50 |
| S_ce | 0.37 | 0.37 | 0.37 | 0.37 | 0.37 | 0.30 |
| S_t | 0.40 | 0.40 | 0.40 | 0.40 | 0.40 | 0.35 |
| Wa mm/wb mm | 4.0/4.0 | 4.0/4.0 | 4.0/4.0 | 4.0/4.0 | 4.0/4.0 | 4.5/3.5 |
| Wa-Wb mm | 0 | 0 | 0 | 0 | 0 | 1.0 |
| Hd2 mm/Hd1 mm | 8.5/7.5 | 8.5/7.5 | 8.5/7.5 | 8.5/7.5 | 8.5/7.5 | 8.5/7.5 |
| Hd2-Hd1 mm | 1.0 | 1.0 | 1.0 | 1.0 | 1.0 | 1.0 |
| Dry steering stability | 95 | 100 | 100 | 90 | 95 | 120 |
| Snow steering stability | 100 | 95 | 100 | 90 | 95 | 115 |

FIG. 7a

| | Working Example 2 | Working Example 3 | Working Example 4 | Working Example 5 | Working Example 6 | Working Example 7 |
|---|---|---|---|---|---|---|
| Tread pattern | FIG. 2 | FIG. 2 | FIG. 2 | FIG. 2 | FIG. 2 | FIG. 2 |
| Number of circumferential main grooves | 3 | 3 | 3 | 3 | 3 | 3 |
| Form of center land portion sipes | Two-dimensional | Two-dimensional | Two-dimensional | Two-dimensional | Two-dimensional | Two-dimensional |
| Form of shoulder land portion sipes | Three-dimensional | Three-dimensional | Three-dimensional | Three-dimensional | Three-dimensional | Three-dimensional |
| N_cc | 80 | 66 | 72 | 72 | 72 | 72 |
| N_sh | 66 | 52 | 62 | 62 | 62 | 62 |
| N_ce-N_sh | 14 | 14 | 10 | 10 | 10 | 10 |
| D_ce/D_sh | 1.5 | 1.5 | 1.0 | 2.5 | 1.5 | 1.5 |
| W_ce/TW | 0.50 | 0.50 | 0.50 | 0.50 | 0.40 | 0.60 |
| S_ce | 0.30 | 0.30 | 0.30 | 0.30 | 0.30 | 0.30 |
| S_t | 0.35 | 0.35 | 0.35 | 0.35 | 0.35 | 0.35 |
| Wa mm/wb mm | 4.5/3.5 | 4.5/3.5 | 4.5/3.5 | 4.5/3.5 | 4.5/3.5 | 4.5/3.5 |
| Wa-Wb mm | 1.0 | 1.0 | 1.0 | 1.0 | 1.0 | 1.0 |
| Hd2 mm/Hd1 mm | 8.5/7.5 | 8.5/7.5 | 8.5/7.5 | 8.5/7.5 | 8.5/7.5 | 8.5/7.5 |
| Hd2-Hd1 mm | 1.0 | 1.0 | 1.0 | 1.0 | 1.0 | 1.0 |
| Dry steering stability | 110 | 125 | 125 | 110 | 125 | 110 |
| Snow steering stability | 120 | 105 | 107 | 120 | 105 | 120 |

FIG. 7b

| | Working Example 8 | Working Example 9 | Working Example 10 | Working Example 11 | Working Example 12 | Working Example 13 |
|---|---|---|---|---|---|---|
| Tread pattern | FIG. 2 | FIG. 2 | FIG. 2 | FIG. 2 | FIG. 2 | FIG. 6 |
| Number of circumferential main grooves | 3 | 3 | 3 | 3 | 3 | 3 |
| Form of center land portion sipes | Two-dimensional | Two-dimensional | Two-dimensional | Two-dimensional | Two-dimensional | Two-dimensional |
| Form of shoulder land portion sipes | Three-dimensional | Three-dimensional | Three-dimensional | Three-dimensional | Three-dimensional | Three-dimensional |
| N_ce | 72 | 72 | 72 | 72 | 72 | 72 |
| N_sh | 62 | 62 | 62 | 62 | 62 | 62 |
| N_ce-N_sh | 10 | 10 | 10 | 10 | 10 | 10 |
| D_ce/D_sh | 1.5 | 1.5 | 1.5 | 1.5 | 1.5 | 1.5 |
| W_ce/TW | 0.50 | 0.50 | 0.50 | 0.50 | 0.50 | 0.50 |
| S_ce | 0.22 | 0.37 | 0.30 | 0.30 | 0.30 | 0.30 |
| S_t | 0.25 | 0.40 | 0.35 | 0.35 | 0.35 | 0.35 |
| Wa mm/wb mm | 4.5/3.5 | 4.5/3.5 | 4.0/3.5 | 5.0/3.0 | 4.5/3.5 | 4.5/3.5 |
| Wa-Wb mm | 1.0 | 1.0 | 0.5 | 2.0 | 1.0 | 1.0 |
| Hd2 mm/Hd1 mm | 8.5/7.5 | 8.5/7.5 | 8.5/7.5 | 8.5/7.5 | 9.5/6.5 | 9.0/7.0 |
| Hd2-Hd1 mm | 1.0 | 1.0 | 1.0 | 1.0 | 3.0 | 2.0 |
| Dry steering stability | 123 | 115 | 120 | 123 | 118 | 130 |
| Snow steering stability | 107 | 120 | 112 | 118 | 118 | 125 |

FIG. 7c

PNEUMATIC TIRE

PRIORITY CLAIM

Priority is claimed to Japan Patent Application Serial No. 2011-249122 filed on Nov. 14, 2011.

BACKGROUND

Technical Field

The present technology relates to a pneumatic tire, and particularly relates to a pneumatic tire by which both dry steering stability and snow steering stability can be achieved.

Related Art

In a typical winter tire, a tread portion has sipes in order to enhance snow steering stability of the tire. The technology described in Japanese Unexamined Patent Application Publication No. 2010-6107 is known as a conventional pneumatic tire that is configured in this manner. In conventional pneumatic tires, compared to the tread portion shoulder region, the tread portion center region is formed from a harder rubber and also has a higher sipe density.

With winter tires, there is a demand for enhancement in not only snow steering stability, but also dry steering stability.

SUMMARY

The present technology provides a pneumatic tire whereby both dry steering stability and snow steering stability can be achieved. A pneumatic tire according to the present technology includes a plurality of circumferential main grooves extending in a tire circumferential direction, and a plurality of land portions that are partitioned and formed by the circumferential main grooves in a tread portion. In such a pneumatic tire, the left and right circumferential main grooves disposed outermost in a tire width direction are called outermost circumferential main grooves, a region on an inner side in the tire width direction of the tread portion, demarcated by groove center lines of the left and right outermost circumferential main grooves is called a center region, and left and right regions on outer sides in the tire width direction are called shoulder regions. The land portion of the center region and the land portions of the left and right shoulder regions each have a plurality of sipes, and not less than 90% of the sipes disposed in the center region are constituted by two-dimensional sipes and not less than 90% of the sipes disposed in the shoulder regions are constituted by three-dimensional sipes. The land portion of the center region and the land portions of the left and right shoulder regions each have a plurality of lug grooves arranged in the tire circumferential direction, and a pitch number $N\_ce$ of the lug grooves in the land portion of the center region and a pitch number $N\_sh$ of the lug grooves in the land portions of the left and right shoulder regions have a relationship such that $N\_ce > N\_sh$.

Additionally, with the pneumatic tire according to the present technology, the pitch number $N\_ce$ of the lug grooves in the center region and the pitch number $N\_sh$ of the lug grooves in the shoulder regions are preferably such that $64 \le N\_ce \le 78$, $54 \le N\_sh \le 68$, and $3 \le N\_ce - N\_sh \le 12$ are satisfied.

Additionally, with the pneumatic tire according to the present technology, a sipe density $D\_ce$ in the center region and a sipe density $D\_sh$ in the shoulder regions preferably have a relationship such that $1.3 \le D\_ce/D\_sh \le 2.0$.

Additionally, with the pneumatic tire according to the present technology, a ground contact width $W\_ce$ of the center region and a tire ground contact width TW preferably have a relationship such that $0.45 \le W\_ce/TW \le 0.55$.

Additionally, with the pneumatic tire according to the present technology, in a tire ground contact patch, a groove area ratio $S\_ce$ within the ground contact width $W\_ce$ of the center region is preferably within a range $0.25 \le S\_ce \le 0.35$, and a total groove area ratio $S\_t$ in the tire ground contact patch is preferably within a range $0.28 \le S\_t \le 0.38$.

Additionally, with the pneumatic tire according to the present technology, a groove width Wa of the lug grooves in the center region and a groove width Wb of the lug grooves in the shoulder regions preferably have a relationship such that $0.5 \text{ mm} \le Wa - Wb \le 2.0 \text{ mm}$.

Additionally, with the pneumatic tire according to the present technology, a groove depth Hd1 of the lug grooves in the center region and a groove depth Hd2 of the lug grooves in the shoulder regions preferably have a relationship such that $1.0 \text{ mm} \le Hd1 - Hd2 \le 3.0 \text{ mm}$.

Additionally, with the pneumatic tire according to the present technology, a single center land portion partitioned and formed by the left and right outermost circumferential main grooves is preferably disposed in the center region. The center land portion preferably includes a plurality of main inclined grooves and a plurality of minor inclined grooves arranged in the tire circumferential direction. Furthermore, it is preferable that the plurality of main inclined grooves each extend while inclining with respect to the tire circumferential direction in a form so as be oriented in a single direction in the tire circumferential direction and to become separated from a tire equatorial plane; a first end of each of the plurality of main inclined grooves communicates with the right or left outermost circumferential main groove; and the plurality of main inclined grooves are disposed alternately in the tire circumferential direction on both sides of the tire equatorial plane. Moreover, it is preferable that the plurality of minor inclined grooves each extend while inclining with respect to the tire circumferential direction in a form so as be oriented in a single direction in the tire circumferential direction and to become separated from a tire equatorial plane; each of the plurality of minor inclined grooves intersects two of the main inclined grooves and both ends thereof terminate within the center land portion; and the plurality of minor inclined grooves are disposed alternately in the tire circumferential direction on both sides of the tire equatorial plane.

With the pneumatic tire according to the present technology, two-dimensional sipes are disposed in the center region, and three-dimensional sipes are disposed in the shoulder regions. Therefore, rigidity in the center region is set to be low and rigidity in the shoulder regions is set to be high. Additionally, a pitch number $N\_ce$ of the lug grooves in the land portion of the center region and a pitch number $N\_sh$ of the lug grooves in the land portions of the left and right shoulder regions have a relationship such that $N\_cc > N\_sh$. Therefore, rigidity in the center region is set to be low and rigidity in the shoulder regions is set to be high. Thus, synergistic lowering of the rigidity in the center region occurs and synergistic increasing of the rigidity in the shoulder regions occurs. As a result, the center region contributes greatly to enhancing snow steering stability and the shoulder regions contribute greatly to enhancing dry steering stability. Such a configuration is advantageous because both dry steering stability and snow steering stability of the tire are achieved at high levels.

BRIEF DESCRIPTION OF THE DRAWINGS

FIGS. 7a-7c are tables showing results of performance testing of pneumatic tires according to embodiments of the present technology.

DETAILED DESCRIPTION

The present technology is described below in detail with reference to the accompanying drawing. However, the present technology is not limited to these embodiments. Moreover, constituents of the embodiment which can possibly or obviously be substituted while maintaining consistency with the present technology are included. Furthermore, a plurality of modified examples that are described in the embodiment can be freely combined within a scope of obviousness for a person skilled, in the art.

Pneumatic Tire

Figure 1:
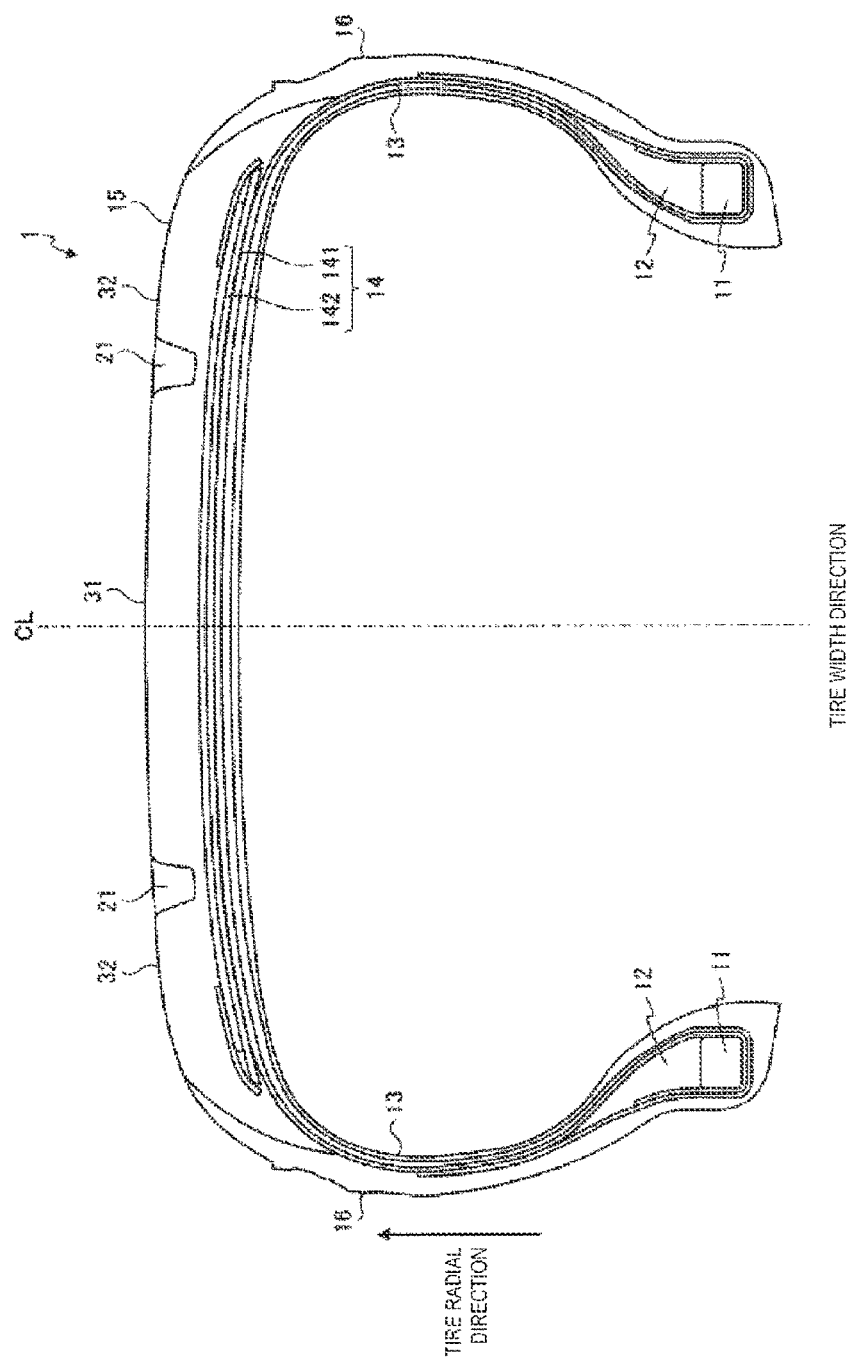
FIG. 1 is a cross-sectional view in a tire meridian direction illustrating a pneumatic tire according to an embodiment of the present technology.
Figure 2:
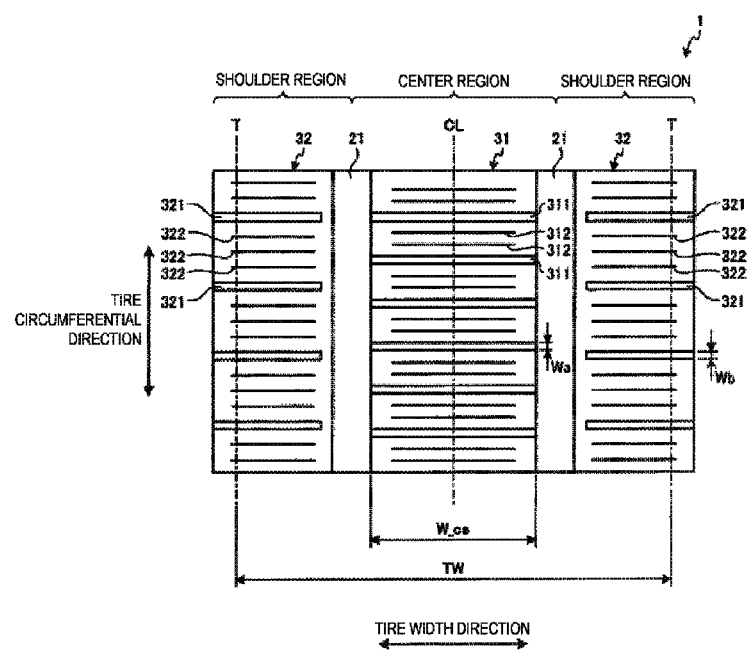
FIG. 2 is a plan view illustrating a tread surface of the pneumatic tire depicted in FIG. 1.

FIG. 1 is a cross-sectional view in a tire meridian direction illustrating a pneumatic tire according to an embodiment of the present technology. FIG. 2 is a plan view illustrating a tread surface of the pneumatic tire depicted in FIG. 1. These drawings depict a radial tire for use on a passenger car.

A pneumatic tire 1 includes a pair of bead cores 11 and 11, a pair of bead fillers 12 and 12, a carcass layer 13, a belt layer 14, tread rubber 15, and a pair of side wall rubbers 16 and 16 (see FIG. 1). The pair of bead cores 11 and 11 has annular structures and constitutes cores of left and right bead portions. The pair of bead fillers 12 and 12 is disposed on a periphery of each of the pair of bead cores 11 and 11 in the tire radial direction so as to reinforce the bead portions. The carcass layer 13 has a single-layer structure, and stretches between the left and right bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. The belt layer 14 is formed from a pair of belt plies 141 and 142 that are laminated, and is disposed in the tire radial direction on a periphery of the carcass layer 13. These belt plies 141 and 142 are formed by arranging and roll processing a plurality of belt cords made from steel or organic fiber material. A crossply structure is achieved by arranging the belt cords so as to incline in mutually different directions in a tire circumferential direction. The tread rubber 15 is disposed on the periphery of the carcass layer 13 and the belt layer 14 in the tire radial direction, and forms a tire tread. The pair of side wall rubbers 16 and 16 is disposed on each outer side of the carcass layer 13 in the tire width direction, so as to form left and right side wall portions of the tire.

Additionally, the pneumatic tire 1 includes a pair of left and right circumferential main grooves 21 and 21 extending in the tire circumferential direction; and a plurality of land portions 31 and 32 partitioned and formed by the circumferential main grooves 21 and 21, in the tread portion (see FIG. 2). Note that "circumferential main grooves" refers to circumferential grooves having a groove width of 3 mm or greater. Additionally, the land portions 31 and 32 may be rows of blocks or may be ribs.

Additionally, the left and right circumferential main grooves 21 and 21 outermost in the tire width direction are called "outermost circumferential main grooves". A region on an inner side in the tire width direction of the tread portion, demarcated by groove center lines of the left and right outermost circumferential main grooves 21 and 21 is called a "center region", and left and right regions on outer sides in the tire width direction are called "shoulder regions".

For example, in this embodiment, the pneumatic tire 1 has a left-right symmetric tread pattern. Additionally, the pair of circumferential main grooves 21 and 21 are disposed so as to be left-right symmetrical in left and right regions demarcated by the tire equatorial plane CL. Moreover, one row of the center land portion 31 and the pair of left and right shoulder land portions 32 and 32 are partitioned by these circumferential main grooves 21 and 21. Additionally, these circumferential main grooves 21 and 21 are the left and right outermost circumferential main grooves and partition the tread portion into the center region and the shoulder regions. Furthermore, each of the center land portion 31 and the left and right shoulder land portions 32 and 32 has a plurality of lug grooves 311 and 321, respectively, extending in the tire width direction. These lug grooves 311 and 321 are disposed at a predetermined pitch in the tire circumferential direction. Moreover, the lug grooves 311 of the center land portion 31 have an open structure, and cross the center land portion 31 in the tire width direction so as to open to each of the left and right edges thereof. As a result, the center land portion 31 is divided in the tire circumferential direction and a row of blocks is formed. On the other hand, the lug grooves 321 of the shoulder land portions 32 have a semi-closed structure, and have an end portion that is open at the edge of the shoulder land portions 32 on the outer side in the tire width direction and an end portion that terminates within the shoulder land portions 32 on the inner side in the tire width direction. Thus, the shoulder land portions 32 form ribs that are continuous in the tire circumferential direction.

Sipe Configuration and Pitch Number of the Lug Grooves

With the pneumatic tire 1, the land portion 31 of the center region and the land portions 32 and 32 of the left and right shoulder regions each have the plurality of sipes 312 and 322, respectively (see FIG. 2). Not less than 90% of the sipes 312 disposed in the center region are constituted by two-dimensional sipes and not less than 90% of the sipes 322 disposed in the shoulder regions are constituted by three-dimensional sipes.

Here, "sipes" refers to cuts formed in a land portion. "Two-dimensional sipes" refers to sipes that have a sipe wall face with a linear form (when viewed as a cross-section from a direction perpendicular to a sipe length direction). "Three-dimensional sipes" refers to sipes that have a sipe wall face with a form bending in a sipe width direction (when viewed as a cross-section from a direction perpendicular to the sipe length direction). Compared to the two-dimensional sipes, the three-dimensional sipes have a greater mating force between opposing sipe wall faces and, therefore, act to reinforce rigidity of the land portions.

For example, in this embodiment, the center land portion 31 and the left and right shoulder land portions 32 and 32 each include the plurality of sipes 312 and 322, respectively. Additionally, the sipes 312 and 322 have a straight form extending in the tire width direction, and are disposed parallely in the tire circumferential direction at a predetermined pitch. Moreover, the sipes 312 and 322 have a closed structure, each terminating within the land portions 31 and 32. Additionally, the sipes 312 of the center land portion 31 are all two-dimensional sipes and the sipes 322 of the left and right shoulder land portions 32 and 32 are all three-dimensional sipes. Thus, due to a difference in rigidity between the two-dimensional sipes 312 and the three-dimensional sipes 322, the rigidity of the center land portion 31 is set to be low and the rigidity of the left and right shoulder land portions 32 and 32 is set to be high.

Additionally, with the pneumatic tire 1, the left and right shoulder land portions 32 and 32 each have a plurality of lug grooves 321 arranged in the tire circumferential direction (see FIG. 2).

The lug grooves are grooves that extend in the tire width direction. The lug grooves may have an open structure or a semi-closed structure. When the lug grooves have an open structure, the land portions become rows of blocks, and when the lug grooves have a semi-closed structure, the land portions become ribs.

For example, with the configuration of FIG. 2, each of the center land portion 31 and the left and right shoulder land portions 32 and 32 has a plurality of lug grooves 311 and 321, respectively, extending in the tire width direction. These lug grooves 311 and 321 are disposed at a predetermined pitch in the tire circumferential direction. Moreover, all of the lug grooves 311 of the center land portion 31 have an open structure, and cross the center land portion 31 in the tire width direction so as to open to each of the left and right edges thereof. As a result, the center land portion 31 is divided in the tire circumferential direction and a row of blocks is formed. On the other hand, the lug grooves 321 of the left and right shoulder land portions 32 and 32 have a semi-closed structure, and have an end portion that is open at the tread edge portion on the outer side in the tire width direction and an end portion that terminates within the land portions on the inner side in the tire width direction. Thus, the left and right shoulder land portions 32 and 32 form ribs that are continuous in the tire circumferential direction.

Additionally, with the pneumatic tire 1, a pitch number N_ce of the lug grooves 311 in the center land portion 31 and a pitch number N_sh of the lug grooves 321 in the left and right shoulder land portions 32 and 32 have a relationship such that N_ce>N_sh. The pitch number of the lug grooves is defined as a total number of the lug grooves that are open to the tire ground contact edge T, throughout an entire circumference of the tire. Thus, when considering the lug grooves that are open to the tire ground contact edge T, a total number of the lug grooves 311 in the center land portion 31 is greater than a total number of the lug grooves 321 in the left and right shoulder land portions 32 and 32.

Note that the tire ground contact edge T is designated at a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load.

Herein, "standard rim" refers to a "standard rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

With the pneumatic tire 1, two-dimensional sipes 312 are disposed in the center region, and three-dimensional sipes 322 are disposed in the shoulder regions. Therefore, rigidity in the center region is set to be low and rigidity in the shoulder regions is set to be high (see FIG. 2). Additionally, a pitch number N_ce of the lug grooves 311 in the land portion 31 of the center region and a pitch number N_sh of the lug grooves 321 in the land portions 32 and 32 of the left and right shoulder regions have a relationship such that N_ce>N_sh. Therefore, rigidity in the center region is set to be low and rigidity in the shoulder regions is set to be high. Thus, synergistic lowering of the rigidity in the center region occurs and synergistic increasing of the rigidity in the shoulder regions occurs. As a result, the center region contributes greatly to enhancing snow steering stability (turning performance on snow) and the shoulder regions contribute greatly to enhancing dry steering stability (high-speed lane changing performance). Therefore, both dry steering stability and snow steering stability of the tire are achieved at high levels.

Figure 3:
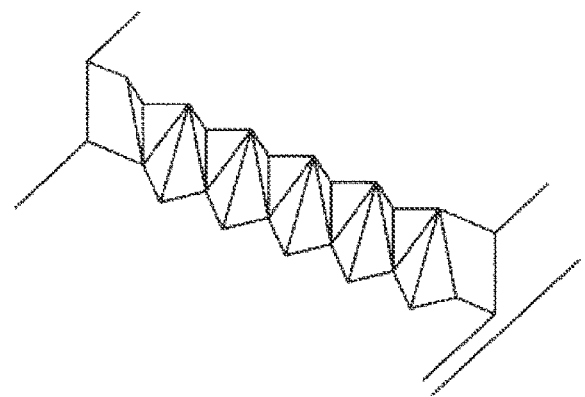
FIG. 3 is an explanatory drawing illustrating an example of a three-dimensional sipe.
Figure 4:
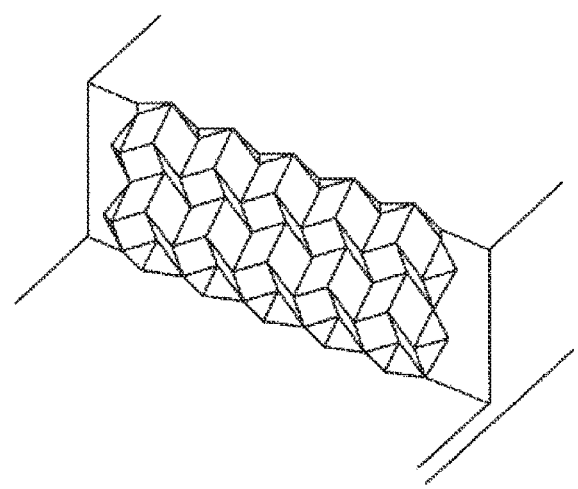
FIG. 4 is an explanatory drawing illustrating an example of a three-dimensional sipe.

FIGS. 3 and 4 are explanatory diagrams illustrating examples of the three-dimensional sipe. These drawings are perspective views of a wall face of the three-dimensional sipe.

With the three-dimensional sipe of FIG. 3, the sipe wall face has a structure in which pyramids and inverted pyramids are connected in the sipe length direction. In other words, the sipe wall face is formed by mutually offsetting pitches of a zigzag form of the tread surface side and a zigzag form of the bottom side in the tire width direction so that mutually opposing protrusions and recesses are formed between the zigzag forms of the tread surface side and the bottom side. Additionally, with these protrusions and recesses, when viewed in a tire rotating direction, the sipe wall face is formed by connecting a protrusion inflection point on the tread surface side to a recess inflection point on the bottom side, a recess inflection point on the tread surface side to a protrusion inflection point on the bottom side, and protrusion inflection points mutually adjacent to the protrusion inflection point on the tread surface side and the protrusion inflection point on the bottom side with ridge lines; and connecting these ridge lines with consecutive planes in the tire width direction. Additionally, a first face of the sipe wall face has a corrugated surface wherein convex pyramids and inverted pyramids thereof are arranged alternating in the tire width direction; and a second face of the sipe wall face has a corrugated surface wherein concave pyramids and inverted pyramids thereof are arranged alternating in the tire width direction. Furthermore, with the sipe wall face, at least the corrugated surfaces disposed at outermost sides of both ends of the sipe are oriented toward an outer side of the blocks. Note that examples of such a three-dimensional sipe include the technology described in Japanese Patent No. 3894743.

Additionally, with the three-dimensional sipe of FIG. 4, the sipe wall face has a structure in which a plurality of prism shapes having a block form are connected in the sipe depth direction and the sipe length direction while inclining with respect to the sipe depth direction. In other words, the sipe wall face has a zigzag form in the tread surface. Additionally, the sipe wall face has bent portions in at least two locations in the tire radial direction in the blocks that bend in the tire circumferential direction and are connected in the tire width direction. Moreover, these bent portions have a zigzag form that oscillates in the tire radial direction. Additionally, while, in the sipe wall face, the oscillation is constant in the tire circumferential direction, an inclination angle in the tire circumferential direction with respect to a normal line direction of the tread surface is configured so as to be smaller at a moiety on the sipe bottom side than at a moiety on the tread surface side; and the oscillation in the tire radial direction of the bent portion is configured so as to be greater at a moiety on the sipe bottom side than at a moiety on the tread surface side. Note that examples of such a three-dimensional sipe include the technology described in Japanese Patent No. 4316452.

Note that, with the pneumatic tire 1, the pitch number $N\_ce$ of the lug grooves 311 in the center region and the pitch number $N\_sh$ of the lug grooves 321 in the shoulder regions are preferably such that $64 \leq N\_ce \leq 78$, $54 \leq N\_sh \leq 68$, and $3 \leq N\_ce - N\_sh \leq 12$ are satisfied. As a result, the relationship between the pitch number $N\_ce$ of the lug grooves 311 in the center region and the pitch number $N\_sh$ of the lug grooves 321 in the shoulder regions is made appropriate.

Additionally, with the configuration described above, a sipe density $D\_ce$ in the center region and a sipe density $D\_sh$ in the shoulder regions preferably have a relationship such that $1.3 \leq D\_ce/D\_sh \leq 2.0$. That is, the sipe density $D\_ce$ of the center region is preferably greater than the sipe density $D\_sh$ of the shoulder regions. As a result, a ratio $D\_ce/D\_sh$ of the sipe density $D\_ce$ of the center region to the sipe density $D\_sh$ of the shoulder regions is made appropriate.

Here, "sipe density" refers to a ratio of sipe length to the ground contact area of a land portion. Sipe length increases due to the sipes being provided with a bending form. Additionally, sipe density can be easily adjusted by, for example, adjusting the sipe length, number of sipes, and the like.

Additionally, with the configuration described above, a ground contact width $W\_ce$ of the center region and a tire ground contact width TW preferably have a relationship such that $0.45 \leq W\_ce/TW \leq 0.55$ (see FIG. 2). As a result, the ground contact width $W\_ce$ of the center region is made appropriate.

For example, in this embodiment, the ground contact width $W\_ce$ of the center region matches the ground contact width of the center land portion 31, and the tire ground contact width TW is defined by the left and right tire ground contact edges T. Moreover, a ratio $W\_ce/TW$ of these constituents is set to be within the range described above.

Note that the ground contact width $W\_ce$ of the center region and the tire ground contact width TW are measured at a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load.

Additionally, with the configuration described above, in a tire ground contact patch, a groove area ratio $S\_ce$ within the ground contact width $W\_ce$ of the center region is within a range $0.25 \leq S\_ce \leq 0.35$, and a total groove area ratio $S\_t$ in the tire ground contact patch is within a range $0.28 \leq S\_t \leq 0.38$. In this configuration, the groove area ratio $S\_ce$ of the center region is made appropriate.

Here, "groove area ratio" is defined as groove area/(groove area+ground contact area). "Groove area" refers to the opening area of the grooves in the contact patch. "Groove" refers to the circumferential grooves and lug grooves in the tread portion and does not include sipes and kerfs. "Ground contact area" refers to the contact area between the tire and the contact patch. Note that the groove area and the ground contact area are measured at a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load.

For example, in this embodiment, the ground contact width $W\_ce$ of the center region matches the ground contact width of the center land portion 31. Therefore, a ratio of the groove area of the lug grooves 311 of the center land portion 31 in the ground contact patch to the ground contact area is calculated as the groove area ratio $S\_ce$ within the ground contact width $W\_ce$ of the center region. Thus, the groove area within the ground contact width $W\_ce$ of the center region does not include the groove area of the circumferential main groove 21, and only includes the groove area of the lug grooves 311. On the other hand, the groove area of the circumferential main groove 21 and the groove areas of the lug grooves 311 and 321 are included in a total groove area in the tire ground contact patch. As a result, the groove area ratio $S\_ce$ within the ground contact width $W\_ce$ of the center region of the ground contact patch and the total groove area ratio $S\_t$ in the tire ground contact patch are calculated and optimized so as to be within the ranges described above.

Additionally, with the configuration described above, a groove width Wa of the lug grooves 311 in the center region and a groove width Wb of the lug grooves 321 in the shoulder regions preferably have a relationship such that $0.5 \text{ mm} \leq Wa - Wb \leq 2.0 \text{ mm}$. In this configuration, the lug grooves 311 of the center region are wide and, therefore, the snow performance of the tire is enhanced, and the lug grooves 321 of the shoulder regions are narrow and, therefore the dry steering stability of the tire is enhanced.

Additionally, with the configuration described above, a groove depth Hd1 of the lug grooves 311 of the center region and a groove depth Hd2 of the lug grooves 321 of the shoulder regions preferably have a relationship such that $1.0 \text{ mm} \leq Hd1 - Hd2 \leq 3.0 \text{ mm}$. In this configuration, the lug grooves 311 of the center region are deep and, therefore, the snow performance of the tire is enhanced, and the lug grooves 321 of the shoulder regions are shallow and, therefore the dry steering stability of the tire is enhanced.

Modified Example 1

Figure 5:
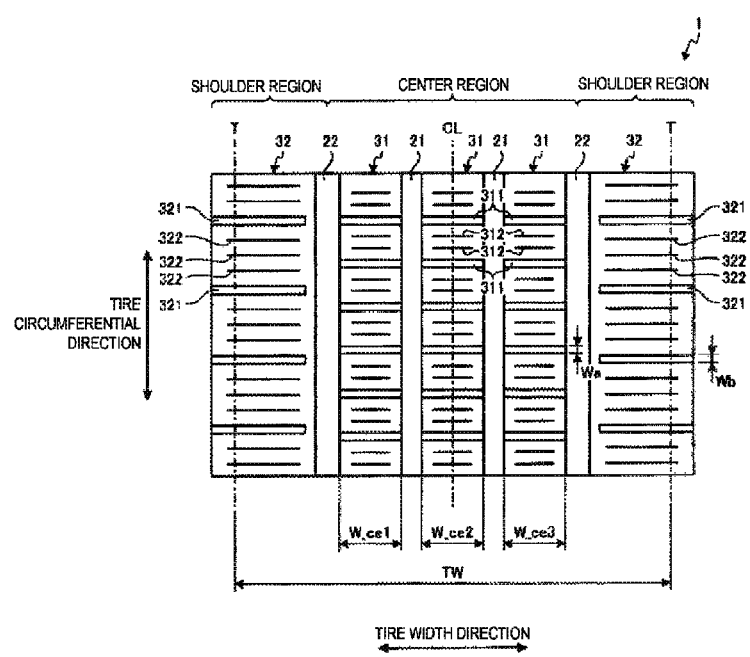
FIG. 5 is an explanatory view illustrating Modified Example 1 of the pneumatic tire depicted in FIG. 1.

FIG. 5 is an explanatory view illustrating Modified Example 1 of the pneumatic tire depicted in FIG. 1.

With the configuration of FIG. 2, a pair of the circumferential main grooves 21 and 21 is disposed, and the tread portion is partitioned into a center region and shoulder regions, demarcated by these circumferential main grooves 21 and 21. However, the configuration is not limited to such and three or more of the circumferential main grooves 21 and 22 may be disposed (see FIG. 5).

For example, with Modified Example 1 of FIG. 5, four of the circumferential main grooves 21 and 22 are disposed so as to be left-right symmetrical in left and right regions demarcated by the tire equatorial plane CL. Moreover, three rows of center land portions 31 and a pair of left and right shoulder land portions 32 and 32 are partitioned by these circumferential main grooves 21 and 22. Additionally, the tread portion is partitioned into a center region and shoulder regions by left and right outermost circumferential main grooves 22 and 22. Furthermore, each of the center land portions 31 has a plurality of lug grooves 311, and is configured as a row of blocks. Moreover, each of the center land portions 31 and the left and right shoulder land portions 32 has a plurality of sipes 312 and 322, respectively. Additionally, all of the sipes 312 disposed in each of the center land portions 31 are two-dimensional sipes, and all of the sipes 322 disposed in the left and right shoulder land portions 32 are three-dimensional sipes.

Note that in configurations having three or more of the circumferential main grooves 21 and 22, the ground contact width W_ce of the center region is the sum of ground contact widths W_ce1 to W_ce3 of each of the center land portions 31 positioned between the left and right outermost circumferential main grooves 22 and 22 (W_ce=W_ce1+W_ce2+W_ce3; see FIG. 5). Additionally, the groove area within the ground contact width W_ce of the center region in the tire ground contact patch does not include the groove areas of each of the circumferential main grooves 21 and 22, and only includes the groove area of the lug grooves 311. On the other hand, the groove areas of all of the circumferential main grooves 21 and 22 and the groove areas of the lug grooves 311 and 321 are included in a total groove area in the tire ground contact patch. Based on this, a groove area ratio S_ce within the ground contact width W_ce of the center region in the tire ground contact patch and the total groove area ratio S_t in the tire ground contact patch are calculated and optimized so as to be within the ranges described above.

Modified Example 2

Figure 6:
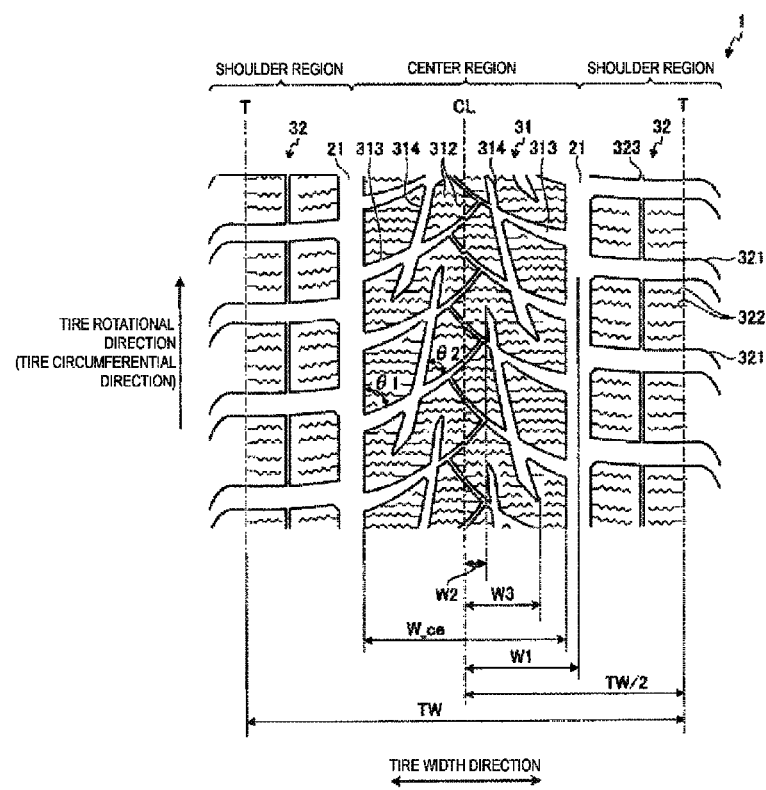
FIG. 6 is an explanatory view illustrating Modified Example 2 of the pneumatic tire depicted in FIG. 1.

FIG. 6 is an explanatory view illustrating Modified Example 2 of the pneumatic tire depicted in FIG. 1. This drawing illustrates a winter tire for use on passenger cars that has a directional tread pattern.

With the configuration of FIG. 2, the center land portion 31 has open structure lug grooves 311, and is configured as a row of blocks. However, the configuration is not limited thereto, and the center land portion 31 may have lug grooves with a semi-closed structure, or lug grooves with a closed structure, which results in the center land portion 31 being provided with a rib-like structure (see FIG. 6). Furthermore, the center land portion 31 may have inclined grooves.

Additionally, with the configuration of FIG. 2, the shoulder land portions 32 each have semi-closed lug grooves 321 and, thereby are formed into ribs. However, the configuration is not limited thereto, and the shoulder land portions 32 may be formed into rows of blocks that are partitioned and formed by a plurality of open structure lug grooves 321 (see FIG. 6).

Additionally, with the configuration of FIG. 2, the sipes 312 of the center land portion 31 and the sipes 322 of the shoulder land portions 32 are all closed sipes. However, the configuration is not limited thereto, and the sipes of the center land portion 31 may be open sipes or semi-closed sipes (see FIG. 6).

For example, with the Modified Example 2 of FIG. 6, the pneumatic tire 1 has a directional tread pattern. Additionally, the pneumatic tire 1 has an indicator of rotational direction based on the forward direction of the vehicle due to such tires generally having an indicator of the mounting direction of the tire on a vehicle. The tire mounting direction is normally stated on the tire side wall portion.

Additionally, the pneumatic tire 1 includes two circumferential main grooves 21 and 21 extending in the tire circumferential direction, one center land portion 31, and left and right shoulder land portions 32 and 32 partitioned and formed by these circumferential main grooves 21 and 21. Additionally, the tire equatorial plane CL is positioned in a center portion of the center land portion 31. Moreover, a distance W1 from the tire equatorial plane CL to the groove center line of the circumferential main groove 21 and a distance TW/2 from the tire equatorial plane CL to the tire ground contact edge T have a relationship such that $0.40 \leq W1/(TW/2) \leq 0.60$.

Additionally, the center land portion 31 has a rib-like structure and includes a plurality of main inclined grooves 313 and a plurality of minor inclined grooves 314.

The main inclined grooves 313 extend while inclining with respect to the tire circumferential direction in a form so as be oriented in a single direction in the tire circumferential direction and to become separated from the tire equatorial plane CL. Additionally, the plurality of main inclined grooves 313 is disposed in the tire circumferential direction at a predetermined pitch and is disposed alternately in the tire circumferential direction on both sides of the tire equatorial plane CL. Moreover, a first end (trailing end with respect to the tire rotational direction) of each of the main inclined grooves 313 is in communication with the left or right circumferential main groove 21 or 21. Furthermore, an angle θ1 that the main inclined grooves 313 form with the circumferential main groove 21, at the first end of the main inclined grooves 313, is within a range $56° \leq \theta1 \leq 76°$. Moreover, a second end (leading end with respect to the tire rotational direction) of each of the main inclined grooves 313 crosses the tire equatorial plane CL and is in communication with another of the main inclined grooves 313. Furthermore, an angle θ2 that the main inclined grooves 313 form with the minor inclined grooves 314, at the second end of the main inclined grooves 313, is within a range $37° \leq \theta2 \leq 57°$. Additionally, the plurality of main inclined grooves 313 form a zigzag-shape center groove extending along the tire circumferential direction on the tire equatorial plane CL. A groove width of each of the main inclined grooves 313 at a portion constituting the center groove is not less than 2 mm and not more than 6 mm, and a groove depth at the same portion is not less than 2 mm and not more than 6 mm.

The minor inclined grooves 314 extend while inclining with respect to the tire circumferential direction in a form so as be oriented in a single direction in the tire circumferential direction and to become separated from the tire equatorial plane CL. Additionally, each of the plurality of minor inclined grooves 314 intersects two of the main inclined grooves 313 and both ends thereof terminate within the center land portion 31. Note that each of the plurality of minor inclined grooves 314 may intersect three or more of the main inclined grooves 313 (not illustrated). Additionally, the plurality of minor inclined grooves 314 is disposed in the tire circumferential direction at a predetermined pitch and is disposed alternately in the tire circumferential direction on both sides of the tire equatorial plane CL. Moreover, a distance W2 from the tire equatorial plane CL to the end on the inner side in the tire width direction of the minor inclined grooves 314 and the distance TW/2 from the tire equatorial plane CL to the tire ground contact edge T have a relationship such that $0.05 \leq W2/(TW/2) \leq 0.25$. Moreover, a distance W3 from the tire equatorial plane CL to the end on the outer side in the tire width direction of the minor inclined grooves 314 and the distance TW/2 from the tire equatorial plane CL to the tire ground contact edge T have a relationship such that $0.25 \leq W3/(TW/2) \leq 0.45$.

The left and right shoulder land portions 32 each have a plurality of lug grooves 321 and a circumferential narrow groove 323, respectively.

Each of the lug grooves 321 has a first end that is in communication with the circumferential main groove 21 and a second end that crosses the tire ground contact edge T and extends in the tire width direction.

Additionally, the circumferential narrow groove 323 is a straight-shape narrow groove extending in the tire circumferential direction. A groove width of the circumferential narrow groove 323 is set to be within a range of not less than 2 mm and not more than 4 mm. Additionally, a groove depth of the circumferential narrow groove 323 is set to be within a range of not less than 2 mm and not more than 4 mm.

Additionally, a pitch number N_ce of the lug grooves 311 in the land portion 31 of the center region and a pitch number N_sh of the lug grooves 321 in the land portions 32 and 32 of the left and right shoulder regions have a relationship such that N_ce>N_sh. Additionally, the center land portion 31 and the left and right shoulder land portions 32 each include the plurality of sipes 312 and 322, respectively. Moreover, not less than 90% of the sipes 312 disposed in the first land portion 31 are constituted by two-dimensional sipes and not less than 90% of the sipes 322 disposed in the shoulder land portions 32 are constituted by three-dimensional sipes.

With the Modified Example 2 of FIG. 6, the center land portion 31 includes the main inclined grooves 313 and the minor inclined grooves 314 that extend toward the outer side in the tire width direction from the vicinity of the tire equatorial plane CL. Therefore, the water discharge performance and the snow discharge performance of the tire are enhanced. Such a configuration is advantageous because the dry steering stability and the snow steering stability are enhanced. Additionally, the minor inclined grooves 314 intersect at least two of the main inclined grooves 313 and are configured so that both ends thereof terminate within the center land portion 31. Moreover, the main inclined grooves 313 and the minor inclined grooves 314 are disposed alternately in the tire circumferential direction. Therefore, the rigidity of the tread portion is maintained. As a result, the snow steering stability can be enhanced while appropriately ensuring the dry steering stability.

Additionally, with the Modified Example 2 of FIG. 6, a ground contact width W_ce of the center region is the same as a width of the center land portion 31 partitioned by the left and right circumferential main grooves 21 and 21 (see FIG. 6). Moreover, groove areas of the main inclined grooves 313 and the minor inclined grooves 314 are included and the groove area of the circumferential main groove 21 is not included in a groove area within the ground contact width W_ce of the center region. On the other hand, the groove area of the left and right circumferential main grooves 21, and the groove areas of the main inclined grooves 313 and the minor inclined grooves 314 are included in a total groove area in the tire ground contact patch. Based on this, a groove area ratio S_ce within the ground contact width W_ce of the center region in the tire ground contact patch and the total groove area ratio S_t in the tire ground contact patch are calculated and optimized so as to be within the ranges described above.

Effects

As described above, the pneumatic tire 1 includes the circumferential main grooves 21 and 21 extending in the tire circumferential direction, the center land portion 31 and the left and right shoulder portions 32 and 32 partitioned and formed by the circumferential main grooves 21 to 23 in the tread portion (see FIG. 2). The land portion 31 of the center region and the land portions 32 of the left and right shoulder regions each have a plurality of sipes 312 and 322, respectively. Not less than 90% of the sipes 312 disposed in the center region are constituted by two-dimensional sipes and not less than 90% of the sipes 322 disposed in the shoulder regions are constituted by three-dimensional sipes. The left and right shoulder land portions 32 and 32 each have a plurality of lug grooves 321 arranged in the tire circumferential direction. A pitch number N_ce of the lug grooves 311 in the land portion 31 of the center region and a pitch number N_sh of the lug grooves 321 in the land portions 32 and 32 of the left and right shoulder regions have a relationship such that N_ce>N_sh.

In this configuration, two-dimensional sipes 312 are disposed in the center region, and three-dimensional sipes 322 are disposed in the shoulder regions. Therefore, rigidity in the center region is set to be low and rigidity in the shoulder regions is set to be high (see FIG. 2). Additionally, a pitch number N_cc of the lug grooves 311 in the land portion 31 of the center region and a pitch number N_sh of the lug grooves 321 in the land portions 32 and 32 of the left and right shoulder regions have a relationship such that N_ce>N_sh. Therefore, rigidity in the center region is set to be low and rigidity in the shoulder regions is set to be high. Thus, synergistic lowering of the rigidity in the center region occurs and synergistic increasing of the rigidity in the shoulder regions occurs. As a result, the center region contributes greatly to enhancing snow steering stability and the shoulder regions contribute greatly to enhancing dry steering stability. Such a configuration is advantageous because both dry steering stability and snow steering stability of the tire are achieved at high levels.

Additionally, with the pneumatic tire 1, the pitch number N_ce of the lug grooves 311 in the center region and the pitch number N_sh of the lug grooves 321 in the shoulder regions are such that $64 \leq N\_ce \leq 78$, $54 \leq N\_sh \leq 68$, and $3 \leq N\_ce-N\_sh \leq 12$ are satisfied. As a result, the relationship between the pitch number N_ce of the lug grooves 311 in the center region and the pitch number N_sh of the lug grooves 321 in the shoulder regions is made appropriate. Such a configuration is advantageous because both dry steering stability and snow steering stability of the tire are achieved at higher levels.

Additionally, with the pneumatic tire 1, the sipe density D_ce in the center region and the sipe density D_sh in the shoulder regions have a relationship such that $1.3 \leq D\_ce/D\_sh \leq 2.0$. With such a configuration, the ratio D_ce/D_sh of the sipe density D_ce of the center region to the sipe density D_sh of the shoulder regions is made appropriate. Such a configuration is advantageous because both dry steering stability and snow steering stability of the tire are achieved at higher levels.

Additionally, with the pneumatic tire 1, the ground contact width W_ce of the center region and the tire ground contact width TW have a relationship such that $0.45 \leq W\_ce/TW \leq 0.55$ (see FIG. 2). With such a configuration, the ground contact width W_ce of the center region is made appropriate. Such a configuration is advantageous because both dry steering stability and snow steering stability of the tire are achieved at higher levels.

Additionally, with the pneumatic tire 1, in the tire ground contact patch, the groove area ratio S_ce within the ground contact width W_ce of the center region is within the range 0.25≤S_ce≤0.35, and the total groove area ratio S_t in the tire ground contact patch is within the range 0.28≤S_t≤0.38. With such a configuration, the groove area ratio S_ce of the center region is made appropriate. Such a configuration is advantageous because both dry steering stability and snow steering stability of the tire are achieved at higher levels.

Additionally, with the pneumatic tire 1, the groove width Wa of the lug grooves 311 in the center region and the groove width Wb of the lug grooves 321 in the shoulder regions have a relationship such that 0.5 mm≤Wa−Wb≤2.0 mm. In this configuration, the lug grooves 311 of the center region are wide and, therefore, the snow performance of the tire is enhanced, and the lug grooves 321 of the shoulder regions are narrow and, therefore the dry steering stability of the tire is enhanced.

Additionally, with the pneumatic tire 1, the groove depth Hd1 of the lug grooves 311 of the center region and the groove depth Hd2 of the lug grooves 321 of the shoulder regions have a relationship such that 1.0 mm≤Hd1−Hd2≤3.0 mm. In this configuration, the lug grooves 311 of the center region are deep and, therefore, the snow performance of the tire is enhanced, and the lug grooves 321 of the shoulder regions are shallow. Such a configuration is advantageous because the dry steering stability of the tire is enhanced.

Additionally, the pneumatic tire 1 includes the one center land portion 31 partitioned and formed by the left and right outermost circumferential main grooves 21 and 21 in the center region (see FIG. 6). The center land portion 31 has the plurality of main inclined grooves 313 and the plurality of minor inclined grooves 314 arranged in the tire circumferential direction. Moreover, the plurality of main inclined grooves 313 each extend while inclining with respect to the tire circumferential direction in a form so as be oriented in a single direction in the tire circumferential direction and to become separated from a tire equatorial plane CL. Additionally, a first end of each of the plurality of main inclined grooves 313 is in communication with the left or right outermost circumferential main groove 21 or 21. Furthermore, the plurality of main inclined grooves 313 is disposed alternately in the tire circumferential direction on both sides of the tire equatorial plane CL. Moreover, the plurality of minor inclined grooves 314 each extend while inclining with respect to the tire circumferential direction in a form so as be oriented in a single direction in the tire circumferential direction and to become separated from a tire equatorial plane CL. Additionally, each of the plurality of minor inclined grooves 314 intersects two of the main inclined grooves 313 and 313, and both ends thereof terminate within the center land portion 31. Additionally, the plurality of minor inclined grooves 314 is disposed alternately in the tire circumferential direction on both sides of the tire equatorial plane CL.

With the configuration described above, the center land portion 31 includes the main inclined grooves 313 and the minor inclined grooves 314 that extend toward the outer side in the tire width direction from the vicinity of the tire equatorial plane CL. Therefore, the water discharge performance and the snow discharge performance of the tire are enhanced. Such a configuration is advantageous because the dry steering stability and the snow steering stability are enhanced.

EXAMPLES

FIGS. 7a-7c are tables showing results of performance testing of pneumatic tires according to embodiments of the present technology.

In the performance testing, a plurality of mutually differing pneumatic tires were evaluated for (1) dry steering stability and (2) snow steering stability (see FIGS. 7a-7c). In these performance tests, pneumatic tires with a tire size of 235/45R19 were assembled on rims with a rim size of 19×8J, inflated to an air pressure of 250 kPa, and loaded with 85% of a "LOAD CAPACITY" stipulated by ETRTO. A sedan type four-wheel drive vehicle with an engine displacement of 3.0 L was used as the test vehicle.

(1) In the evaluations for dry steering stability, the test vehicle on which the pneumatic tires were mounted was driven at a speed of from 60 km/h to 240 km/h on a flat circuit test course. Then the test driver performed a sensory evaluation regarding steering while lane changing and cornering and stability while traveling forward. Results of the evaluations were indexed and the index value of the pneumatic tire of Comparative Example 1 was set as the standard score (100). Higher scores were preferable.

(2) In the evaluations for snow steering stability, the test vehicle on which the pneumatic tires were mounted was driven at a speed of 40 km/h on a handling course in a snow road testing facility, and the test driver performed a sensory evaluation. Results of the evaluations were indexed and the index value of the pneumatic tire of Comparative Example 1 was set as the standard score (100). Higher scores were preferable.

The pneumatic tires 1 of Working Examples 1 to 12 had the structure of FIG. 1 and the tread pattern of FIG. 2, and included three circumferential main grooves 21 to 23 and four land portions 31 to 34 in the tread portion. Additionally, the sipes 312 in the land portion 31 of the center region were constituted by two-dimensional sipes and the sipes 322 in the shoulder regions were constituted by three-dimensional sipes. The left and right shoulder land portions 32 and 32 each had a plurality of lug grooves 321 arranged in the tire circumferential direction. A pitch number N_ce of the lug grooves 311 in the center land portion 31 and a pitch number N_sh of the lug grooves 321 in the left and right shoulder land portions 32 and 32 had a relationship such that N_ce>N_sh. Additionally, the relationship between the sipe density D_ce of the center region and the sipe density D_sh of the shoulder regions was adjusted. Additionally, the groove area ratio in the center region and the groove area ratio in the shoulder regions of the tire ground contact patch were adjusted by adjusting the groove area or the disposal pitch of the lug grooves of the land portions 31 and 32.

Additionally, the pneumatic tire 1 of Working Example 13 had the tread pattern of FIG. 6; and all of the sipes 312 in the center land portion 31 were constituted by two-dimensional sipes, and all of the sipes 322 in the shoulder land portions 32 were constituted by three-dimensional sipes. Additionally, the pitch number N_ce of the lug grooves 311 of the center land portion 31 and the pitch number N_sh of the lug grooves 321 of the shoulder land portions 32 had a relationship such that N_ce>N_sh.

The pneumatic tires of Conventional Examples 1 and 2 included three circumferential main grooves and four land portions in the tread portion. Additionally, the sipes in each of the land portions were all two-dimensional sipes. Moreover, the pitch number N_ce of the lug grooves in the center land portion and the pitch number N_sh of the lug grooves in the shoulder land portions had a relationship such that N_ce>N_sh.

As is clear from the test results, with the pneumatic tires 1 of Working Examples 1 to 13, compared with the pneumatic tires of Conventional Examples 1 and 2, the dry steering stability and the snow steering stability of the tires are enhanced (see FIGS. 7a-7c).

What is claimed is:

1. A pneumatic tire comprising a plurality of circumferential main grooves extending in a tire circumferential direction, and a plurality of land portions that are partitioned and formed by the circumferential main grooves in a tread portion, wherein,
when the left and right circumferential main grooves disposed outermost in a tire width direction are called outermost circumferential main grooves, a region on an inner side in the tire width direction of the tread portion, demarcated by groove center lines of the left and right outermost circumferential main grooves is called a center region, each of the land portions within the center region is called a center land portion, each of left and right regions on outer sides in the tire width direction is called a shoulder region, and each of the land portions within the shoulder regions is called a shoulder land portion,
the center land portions and the shoulder land portions each comprise a plurality of sipes,
not less than 90% of the sipes disposed in the center region are constituted by two-dimensional sipes and not less than 90% of the sipes disposed in the shoulder regions are constituted by three-dimensional sipes,
the center land region and the shoulder land regions each comprise a plurality of lug grooves arranged in the tire circumferential direction,
a pitch number N_ce of the lug grooves in the center land region and a pitch number N_sh of the lug grooves in the shoulder land regions have a relationship such that N_ce>N_sh,
a ground contact width W_ce of the center region is defined a sum of ground contact widths of the land portions positioned between the left and right outermost circumferential main grooves,
a ground contact width W_ce of the center region and a tire ground contact width TW have a relationship such that 0.45<W_ce/TW<0.55,
the lug grooves of the center land region include a plurality of main inclined grooves and a plurality of minor inclined grooves arranged in the tire circumferential direction,
each of the minor inclined grooves intersects each of at least two of the main inclined grooves at an intermediate portion with one another, and both ends thereof terminate within a center land portion,
a first end of each of the main inclined grooves is in communication with either one of the left and right circumferential main grooves, and
a second end of each of the main inclined grooves is in communication with an intermediate portion of another one of the main inclined grooves across the tire equatorial plane.

2. The pneumatic tire according to claim 1, wherein the pitch number N_ce of the lug grooves in the center region and the pitch number N_sh of the lug grooves in the shoulder regions are such that $64 \leq N\_ce \leq 78$, $54 \leq N\_sh \leq 68$, and $3 \leq N\_ce - N\_sh \leq 12$ are satisfied.

3. The pneumatic tire according to claim 1, wherein a sipe density D_ce in the center region and a sipe density D_sh in the shoulder regions have a relationship such that $1.3 \leq D\_ce/D\_sh \leq 2.0$.

4. The pneumatic tire according to claim 1, wherein, in a tire ground contact patch, a groove area ratio S_ce within the ground contact width W_ce of the center region is within a range $0.25 \leq S\_ce \leq 0.35$, and a total groove area ratio S_t in the tire ground contact patch is within a range $0.28 \leq S\_t \leq 0.38$.

5. The pneumatic tire according to claim 1, wherein a groove width Wa of the lug grooves in the center region and a groove width Wb of the lug grooves in the shoulder regions have a relationship such that $0.5 \text{ mm} \leq Wa - Wb \leq 2.0 \text{ mm}$.

6. The pneumatic tire according to claim 1, wherein a groove depth Hd1 of the lug grooves in the center region and a groove depth Hd2 of the lug grooves in the shoulder regions have a relationship such that $1.0 \text{ mm} \leq Hd1 - Hd2 \leq 3.0 \text{ mm}$.

7. The pneumatic tire according to claim 1, wherein
the plurality of main inclined grooves each extend while inclining with respect to the tire circumferential direction in a form so as be oriented in a single direction in the tire circumferential direction and to become separated from a tire equatorial plane;
the plurality of main inclined grooves are disposed alternately in the tire circumferential direction on both sides of the tire equatorial plane;
the plurality of minor inclined grooves each extend while inclining with respect to the tire circumferential direction in a form so as be oriented in a single direction in the tire circumferential direction and to become separated from a tire equatorial plane; and
the plurality of minor inclined grooves are disposed alternately in the tire circumferential direction on both sides of the tire equatorial plane.

8. The pneumatic tire according to claim 1, wherein:
the plurality of main inclined grooves each extend while inclining with respect to the tire circumferential direction in a form so as be oriented in a single direction in the tire circumferential direction and to become separated from a tire equatorial plane;
a first end of each of the plurality of main inclined grooves communicates with the right or left outermost circumferential main groove; and
the plurality of main inclined grooves are disposed alternately in the tire circumferential direction on both sides of the tire equatorial plane.

9. The pneumatic tire according to claim 1, wherein:
the plurality of minor inclined grooves each extend while inclining with respect to the tire circumferential direction in a form so as be oriented in a single direction in the tire circumferential direction and to become separated from a tire equatorial plane; and
the plurality of minor inclined grooves are disposed alternately in the tire circumferential direction on both sides of the tire equatorial plane.

10. The pneumatic tire according to claim 1, wherein:
the plurality of main inclined grooves each extend while inclining with respect to the tire circumferential direction in a form so as be oriented in a single direction in the tire circumferential direction and to become separated from a tire equatorial plane.

11. The pneumatic tire according to claim 1, wherein:
the plurality of minor inclined grooves each extend while inclining with respect to the tire circumferential direction in a form so as be oriented in a single direction in the tire circumferential direction and to become separated from a tire equatorial plane.

12. The pneumatic tire according to claim 1, wherein: the plurality of main inclined grooves are disposed alternately in the tire circumferential direction on both sides of the tire equatorial plane.

13. The pneumatic tire according to claim 1, wherein: the plurality of minor inclined grooves are disposed alternately in the tire circumferential direction on both sides of the tire equatorial plane.

14. The pneumatic tire according to claim 1, wherein a sipe density $D\_ce$ in the center region and a sipe density $D\_sh$ in the shoulder regions have a relationship such that $1.3 \leq D\_ce/D\_sh \leq 2.0$; and wherein, in a tire ground contact patch, a groove area ratio $S\_ce$ within the ground contact width $W\_ce$ of the center region is within a range $0.25 \leq S\_ce \leq 0.35$, and a total groove area ratio $S\_t$ in the tire ground contact patch is within a range $0.28 \leq S\_t \leq 0.38$.

15. The pneumatic tire according to claim 1, wherein a groove width Wa of the lug grooves in the center region and a groove width Wb of the lug grooves in the shoulder regions have a relationship such that $0.5 \text{ mm} \leq Wa-Wb \leq 2.0 \text{ mm}$; and wherein a groove depth Hd1 of the lug grooves in the center region and a groove depth Hd2 of the lug grooves in the shoulder regions have a relationship such that $1.0 \text{ mm} \leq Hd1-Hd2 \leq 3.0 \text{ mm}$.

16. The pneumatic tire according to claim 1, wherein the ground contact width $W\_ce$ of the center region and the tire ground contact width TW have a relationship such that $0.50 < W\_ce/TW < 0.55$.

17. The pneumatic tire according to claim 1, wherein:
the lug grooves of the shoulder land regions have a semi-closed structure,
the lug grooves of the shoulder land regions have an end portion that is open at an edge of the shoulder land regions on the outer side in the tire width direction and an end portion that terminates within the shoulder land portions on the inner side in the tire width direction, and
the shoulder land portions form ribs that are continuous in the tire circumferential direction.

18. The pneumatic tire according to claim 1, wherein the two-dimensional sipes and the three-dimensional sipes have a closed structure, each terminating within the land portions.

19. The pneumatic tire according to claim 1, wherein
the plurality of minor inclined grooves or the plurality of main inclined grooves are disposed alternately in the tire circumferential direction on both sides of the tire equatorial plane; and
at least one of $0.5 \text{ mm} \leq Wa-Wb \leq 2.0 \text{ mm}$ or $1.0 \text{ mm} \leq Hd1-Hd2 \leq 3.0 \text{ mm}$ is satisfied, where Wa is a groove width of the lug grooves in the center region, Wb is a groove width of the lug grooves in the shoulder regions, Hd1 is a groove depth of the lug grooves in the center region, and Hd2 is a groove depth of the lug grooves in the shoulder regions.

20. A pneumatic tire comprising a plurality of circumferential main grooves extending in a tire circumferential direction, and a plurality of land portions that are partitioned and formed by the circumferential main grooves in a tread portion, wherein,
when the left and right circumferential main grooves disposed outermost in a tire width direction are called outermost circumferential main grooves, a region on an inner side in the tire width direction of the tread portion, demarcated by groove center lines of the left and right outermost circumferential main grooves is called a center region, each of the land portions within the center region of the land portions is called a center land portion, each of left and right regions on outer sides in the tire width direction is called a shoulder region, and each of the land portions within the shoulder regions is called a shoulder land portion,
the center land portions and the shoulder land portions each comprise a plurality of sipes,
not less than 90% of the sipes disposed in the center region are constituted by two-dimensional sipes and not less than 90% of the sipes disposed in the shoulder regions are constituted by three-dimensional sipes,
the center land region and the shoulder land regions each comprise a plurality of lug grooves arranged in the tire circumferential direction,
a pitch number $N\_ce$ of the lug grooves in the center land region and a pitch number $N\_sh$ of the lug grooves in the shoulder land regions have a relationship such that $N\_ce > N\_sh$,
a ground contact width $W\_ce$ of the center region is defined a sum of ground contact widths of the land portions positioned between the left and right outermost circumferential main grooves and in a tire ground contact patch, a groove area ratio $S\_ce$ within the ground contact width $W\_ce$ of the center region is within a range $0.25 \leq S\_ce \leq 0.35$, and a total groove area ratio $S\_t$ in the tire ground contact patch is within a range $0.28 \leq S\_t \leq 0.38$,
the lug grooves of the center land region include a plurality of main inclined grooves and a plurality of minor inclined grooves arranged in the tire circumferential direction,
each of the minor inclined grooves intersects each of at least two of the main inclined grooves at an intermediate portion with one another, and both ends thereof terminate within a center land portion,
a first end of each of the main inclined grooves is in communication with either one of the left and right circumferential main grooves, and
a second end of each of the main inclined grooves is in communication with an intermediate portion of another one of the main inclined grooves across the tire equatorial plane.

21. The pneumatic tire according to claim 20, wherein the total groove area ratio $S\_t$ and the groove area ratio $S\_ce$ have a relationship $0.03 \leq S\_t - S\_ce \leq 0.05$.

22. A pneumatic tire comprising a plurality of circumferential main grooves extending in a tire circumferential direction, and a plurality of land portions that are partitioned and formed by the circumferential main grooves in a tread portion, wherein,
when the left and right circumferential main grooves disposed outermost in a tire width direction are called outermost circumferential main grooves, a region on an inner side in the tire width direction of the tread portion, demarcated by groove center lines of the left and right outermost circumferential main grooves is called a center region, each of the land portions within the center region is called a center land portion, each of left and right regions on outer sides in the tire width direction is called a shoulder region, and each of the land portions within the shoulder regions is called a shoulder land portion,
the center land portions and the shoulder land portions each comprise a plurality of sipes, not less than 90% of the sipes disposed in the center region are constituted by two-dimensional sipes and not less than 90% of the sipes disposed in the shoulder regions are constituted by three-dimensional sipes, the center land region and the shoulder land regions each comprise a plurality of lug grooves arranged in the tire circumferential direction, a pitch number $N\_ce$ of the lug grooves in the center land region and a pitch number $N\_sh$ of the lug grooves in the shoulder land regions have a relationship such that $N\_ce > N\_sh$, the lug grooves of the center land region include a plurality of main inclined grooves and a plurality of minor inclined grooves arranged in the tire circumferential direction, each of the minor inclined grooves intersects each of at least two of the main inclined grooves at an intermediate area with one another, and both ends thereof terminate within a center land portion, a first end of each of the main inclined grooves is in communication with either one of the left and right circumferential main grooves, and a second end of each of the main inclined grooves is in communication with an intermediate portion of another one of the main inclined grooves across the tire equatorial plane.

\* \* \* \* \*